United States Patent
Larramendy et al.

[19]

[11] Patent Number: 5,927,655
[45] Date of Patent: Jul. 27, 1999

[54] DEVICE FOR CONTROLLING THE THRUST OF A MULTI-ENGINE AIRCRAFT

[75] Inventors: Panxika Larramendy; Patrick Zaccaria, both of Toulouse; Thierry Clavel, Blagnac; François Garavel, Toulouse, all of France

[73] Assignee: Aerospatiale Societe Nationale Industrielle, Paris, France

[21] Appl. No.: 08/925,605

[22] Filed: Sep. 8, 1997

[30] Foreign Application Priority Data

Sep. 9, 1996 [FR] France .................................. 96 10965

[51] Int. Cl.$^6$ .................................................. B64D 31/10
[52] U.S. Cl. ............................................ 244/195; 701/99
[58] Field of Search ............................... 244/76 R, 53 R, 244/62, 55, 194, 195; 701/3, 99, 100, 112, 183, 182; 60/702

[56] References Cited

U.S. PATENT DOCUMENTS

| | | | |
|---|---|---|---|
| 3,160,367 | 12/1964 | Lecarme ................................. | 244/76 R |
| 3,987,279 | 10/1976 | Borelan et al. ...................... | 235/150.21 |
| 4,034,938 | 7/1977 | Borelan et al. ........................ | 244/53 R |
| 4,106,730 | 8/1978 | Spitzer et al. ........................... | 244/183 |
| 4,884,205 | 11/1989 | Hernandez-diaz ..................... | 244/76 R |
| 5,608,627 | 3/1997 | Lecomte et al. ................. | 364/424.012 |

FOREIGN PATENT DOCUMENTS

| | | |
|---|---|---|
| 0 344 389 | 12/1989 | European Pat. Off. . |
| 2 308 975 | 11/1976 | France . |
| 2 710 026 | 3/1995 | France . |

OTHER PUBLICATIONS

French Search Report dated May 29, 1997, 3 pages.

*Primary Examiner*—Galen L. Barefoot
*Attorney, Agent, or Firm*—Marshall, O'Toole, Gerstein, Murray & Borun

[57] ABSTRACT

The present invention relates to a device for controlling the thrust of an aircraft, with several engines (M1, M4), comprising calculation units (UC1, UC4) that formulate first commands for controlling the engine speeds. According to the invention, said device (1) additionally comprises means (CONT1, CONT4) of controlling the two outer engines (M1, M4), calculation means that formulate second commands for controlling the speed of the outer engines (M1, M4) making it possible to obtain a reduction in thrust, and switching means which, during normal operation of the outer engines (M1, M4) send the first commands to these engines and, when one outer engine (M1) fails, send the second commands to the opposite outer engine (M4).

20 Claims, 2 Drawing Sheets

DEVICE FOR CONTROLLING THE THRUST OF A MULTI-ENGINE AIRCRAFT

BACKGROUND OF THE INVENTION

The present invention relates to a device for controlling the thrust of an aircraft, this thrust being generated by a number of engines.

More specifically, the present invention applies to an aircraft, especially a civil transport airplane, that has a number of engines set out more or less in a line which is orthogonal to the longitudinal axis of the aircraft, and are arranged respectively so that they are symmetric with respect to said longitudinal axis.

For such an aircraft, there is generally defined a minimum specified speed that corresponds to the minimum speed for which it is possible to control the lateral behavior of the aircraft in the event of asymmetry in the thrust as a result of the failure of an engine. This minimum specified speed is characterized by the fact that when an outer engine has failed, maximum rudder has been applied, and the engines that are working are at full thrust, the heading can be maintained with less than 5° of bank.

A multi-engine aircraft of this kind therefore, when on an approach flight path, with all its engines operating, needs to have a speed that is higher than said minimum specified speed so that should one of its engines fail, the other engines can be run at full thrust (over-shoot) while maintaining an angle of bank of less than 5°. Of course, for the application of rudder to have sufficient effect, the speed needs to be high enough.

Said minimum specified speed therefore leads to a substantial and disadvantageous limitation to the flight envelope of the aircraft.

Furthermore, it is known that an aircraft needs to comply with a number of stipulated constraints directly associated with the thrust available and therefore indirectly associated with said minimum specified speed.

On the one hand, when during landing, an aircraft needs to overshoot for some reason or another, the thrust available needs to allow it to comply with the strict stipulated constraints regarding the climb angle. This angle in effect needs to be higher than a predetermined value which differs depending on whether or not one of the engines has failed. If the aircraft is not capable of complying with these constraints, the only possible solution is to reduce the maximum permissible mass for landing.

On the other hand, another stipulated constraint requires the aircraft to be able to set down on the takeoff and landing runway 15 minutes after having taken off from there. For this, its mass must not exceed a maximum specified mass for landing, which mass is directly associated with the thrust available. To satisfy this condition, either said aircraft needs to be equipped with a system for dumping its fuel, or its mass on take-off needs to be limited. Of course neither of these solutions is satisfactory, especially as regards the optimization of aircraft performance.

SUMMARY OF THE INVENTION

The purpose of the present invention is to overcome these drawbacks. The present invention therefore relates to a device for controlling the thrust of a multi-engine aircraft that makes it possible in a simple, effective and inexpensive way, to limit the aforementioned minimum specified speed of the aircraft.

For this, according to the invention, said device which comprises calculation units associated respectively with each of said engines, each of said calculation units formulating first commands for controlling the speed of the associated engine and sending said first commands to said associated engine, is noteworthy in that it additionally comprises:

control means which respectively monitor the operation of at least some of said engines and which detect failures of said monitored engines;

calculation means which are associated respectively at least with the calculation units associated with said monitored engines and which determine second commands for controlling the speed of said monitored engines making it possible to reduce the thrust of these engines relative to said first commands; and switching means associated with said calculation means and with the corresponding calculation units and which:
when said monitored engines are operating normally send the corresponding first commands to these engines; and which
when one of said monitored engines fails, send the corresponding second commands to at least one engine which is on the opposite side of the longitudinal axis of the aircraft to said failed engine.

Thus, thanks to the invention, by reducing, in the event of failure, the thrust on the opposite side to the failed engine, the thrust asymmetry caused by this failure is reduced and this makes it possible to reduce the minimum specified speed of the aircraft.

This reduction in particular leads to the following advantages:

it reduces the zone of mass limited by said minimum specified speed, which in particular makes it possible to improve safety for the lateral control of an aircraft at reduced speed and mass, with one engine failed; and it reduces the operational speed, and therefore the approach speed and length of runway needed for landing.

In addition, if the operational speed is no longer limited by the minimum specified speed, the same approach angle of attack can be maintained irrespective of the mass of the aircraft.

The device in accordance with the invention can be used in five different embodiments.

In a first particularly advantageous embodiment of the invention, said device in accordance with the invention comprises control means, calculation means and switching means associated with the two outer engines which are the ones furthest from and one on each side of the longitudinal axis of the aircraft, and intended, when one of said outer engines fails, to reduce the thrust of the other outer engine.

In a second embodiment, the device in accordance with the invention comprises control means, calculation means and switching means associated with each of the engines of the aircraft and intended, when any one engine of the aircraft fails, to reduce the thrust of the engine which is on the opposite side of the longitudinal axis of the aircraft to said failed engine.

In a third embodiment, said device in accordance with the invention comprises control means, calculation means and switching means associated with each of the engines of the aircraft and intended, when one of the two outer engines fails, these engines being the ones furthest away from and one on either side of the longitudinal axis of the aircraft, to reduce the thrust of all the engines on the opposite side of the longitudinal axis of the aircraft to said failed engine.

In a fourth embodiment, the device in accordance with the invention comprises control means, calculation means and switching means associated with each of the engines of the aircraft and intended, when any one engine of the aircraft fails, to reduce the thrust of the outer engine which is on the opposite side of the longitudinal axis of the aircraft to said failed engine.

In a fifth embodiment, which allows the principle of the invention to be generalized, the device in accordance with the invention comprises control means, calculation means and switching means associated with each of the engines of the aircraft and intended, when any one engine of the aircraft fails, to reduce the thrust of all the engines on the opposite side of the longitudinal axis of the aircraft to said failed engine.

Advantageously, said calculation means formulate said second commands only when the aircraft is in a defined flight envelope. As a preference, this flight envelope is defined by the following two combined conditions: the speed (or of course the Mach number) and the altitude of the aircraft are below pre-defined values.

Furthermore, said calculation means and said switching means are advantageously incorporated each time into the associated calculation unit, which makes it possible to reduce the overall size of the device in accordance with the invention.

Furthermore, as a preference, said control means detect failure of a monitored engine when the value of a parameter characteristic of the operation of said engine, for example the speed of the low-pressure module, lies outside an envelope of permissible predetermined values.

In addition, said second commands for controlling the engine speed are advantageously formulated as a function of the altitude, the temperature and the speed of the aircraft.

Furthermore, as a preference, said second commands for controlling the engine speed are formulated in such a way as to obtain a thrust for which the aircraft can be steadied, should one of said engines fail, at a predetermined speed which is chosen to be lower than said initially specified minimum speed so as to obtain a lower minimum speed.

Furthermore, in a first embodiment of the invention, the control means associated with a pair of opposed engines are connected to each other and communicate information regarding detected failures to each other, while in a second embodiment, said control means are incorporated into a central control unit, which makes it possible to reduce the number of components needed for control.

BRIEF DESCRIPTION OF THE DRAWING

The figures of the appended drawing will make it easy to understand how the invention may be realized. In these figures, identical references denote similar elements.

DETAILED DESCRIPTION OF THE PREFERRED EMBODIMENT

Figure 1:
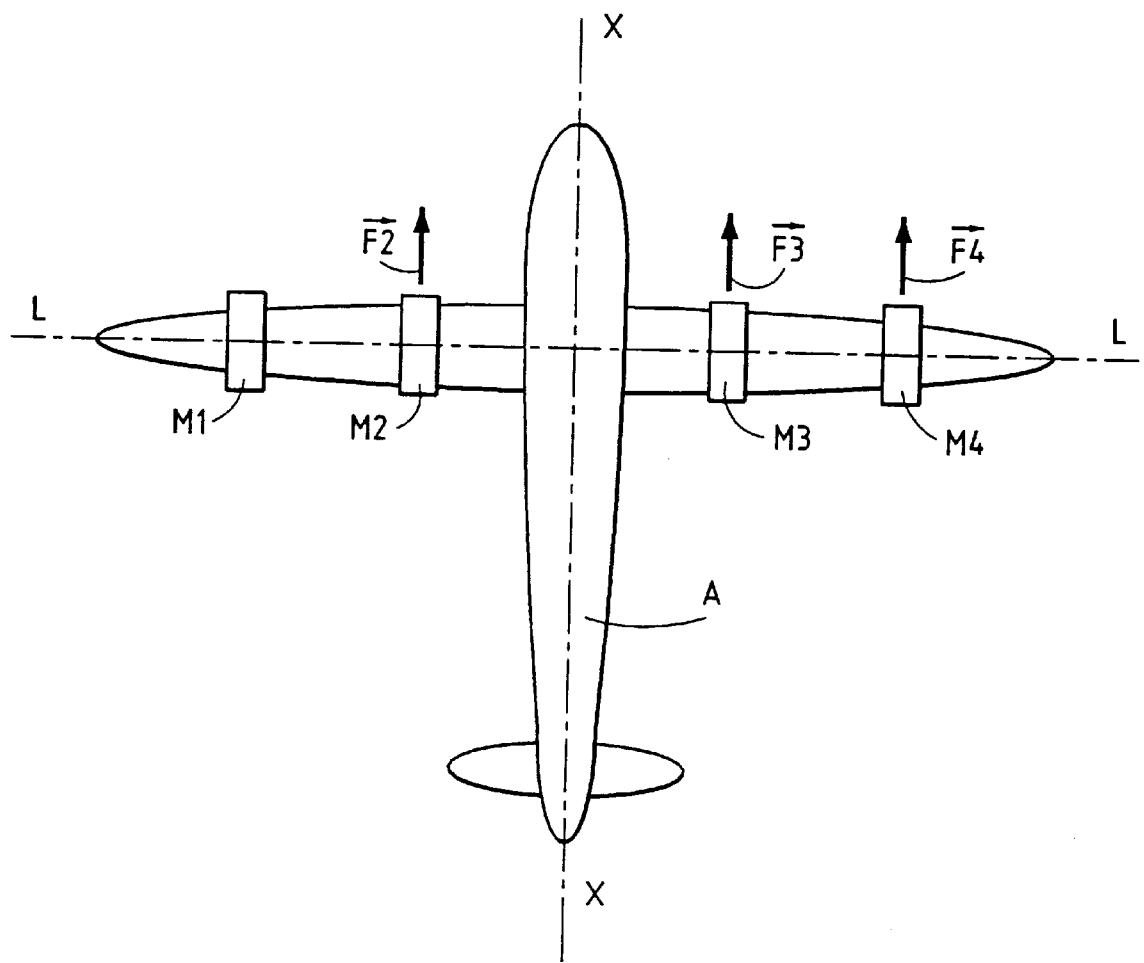
FIG. 1 gives a diagrammatic representation of a multi-engine aircraft, in which a device in accordance with the invention is used.

The device 1 in accordance with the invention is intended for controlling the thrust of an aircraft A, for example a civil transport airplane, fitted with a number of engines M1 to M4 set out in a line L—L orthogonal to the longitudinal axis X—X of the aircraft A and arranged respectively so that they are symmetric with respect to said longitudinal axis X—X, as depicted diagrammatically in FIG. 1.

Figure 2:
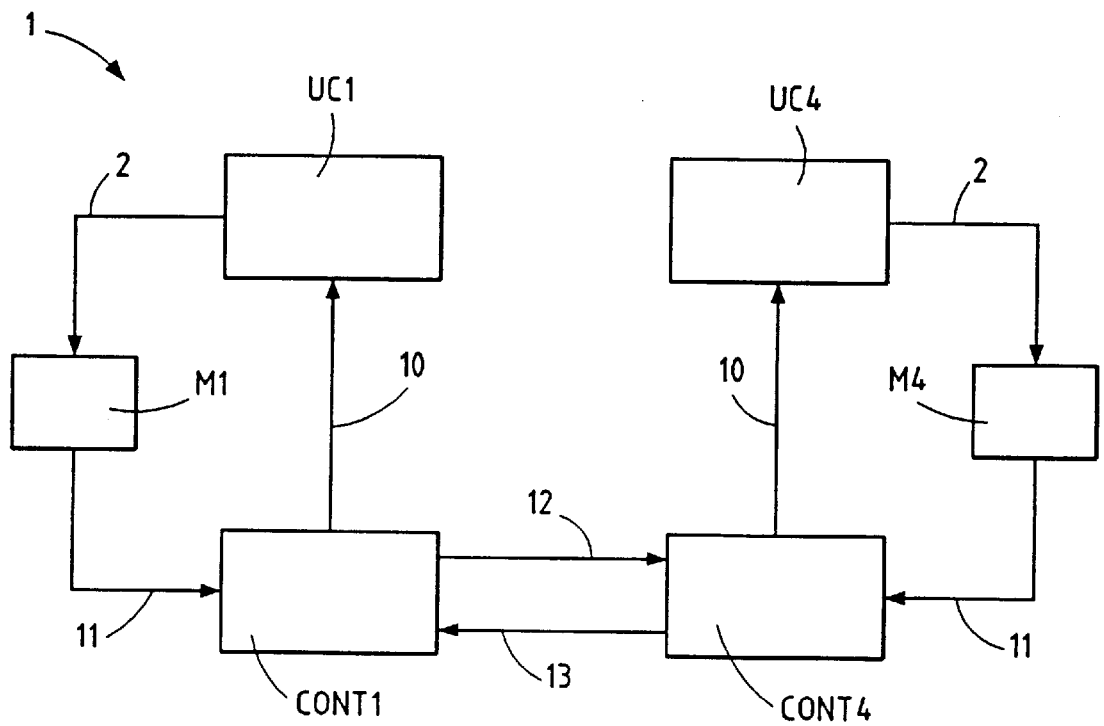
FIG. 2 diagrammatically illustrates a device in accordance with the invention.

In a known way, said device 1 comprises, for each of the engines M1 to M4, and as depicted in FIG. 2 for the engines M1 and M4, a calculation unit UC1 and UC4 respectively which formulates first commands for controlling the speed of the associated engine and sends said first commands to said associated engine via connections 2 respectively. In the embodiment depicted, said first commands are calculated by a calculator CAL incorporated into the calculation unit, for example the calculation unit UC1 depicted in FIG. 3, on the basis of ambient conditions, that is to say on the basis of the temperature, the speed and the altitude of the aircraft A, which are transmitted to said calculator CAL by connections 4 to 6 respectively. The temperature, the speed (or the Mach number) and the altitude of the aircraft A are output for this purpose from appropriate devices that have not been depicted.

In accordance with the invention, said device 1 is intended to reduce the minimum specified speed of the aircraft A. In the known way, this minimum specified speed corresponds to the minimum speed for which it is possible to control the lateral behavior of the aircraft A in the event of thrust asymmetry resulting from the failure of an engine.

In the description that follows it will be assumed that the engine M1 has failed and that the engines M2 to M4 are generating thrust, the action of which is illustrated by arrows $\vec{F2}$ to $\vec{F4}$ respectively in FIG. 1.

Figure 3:
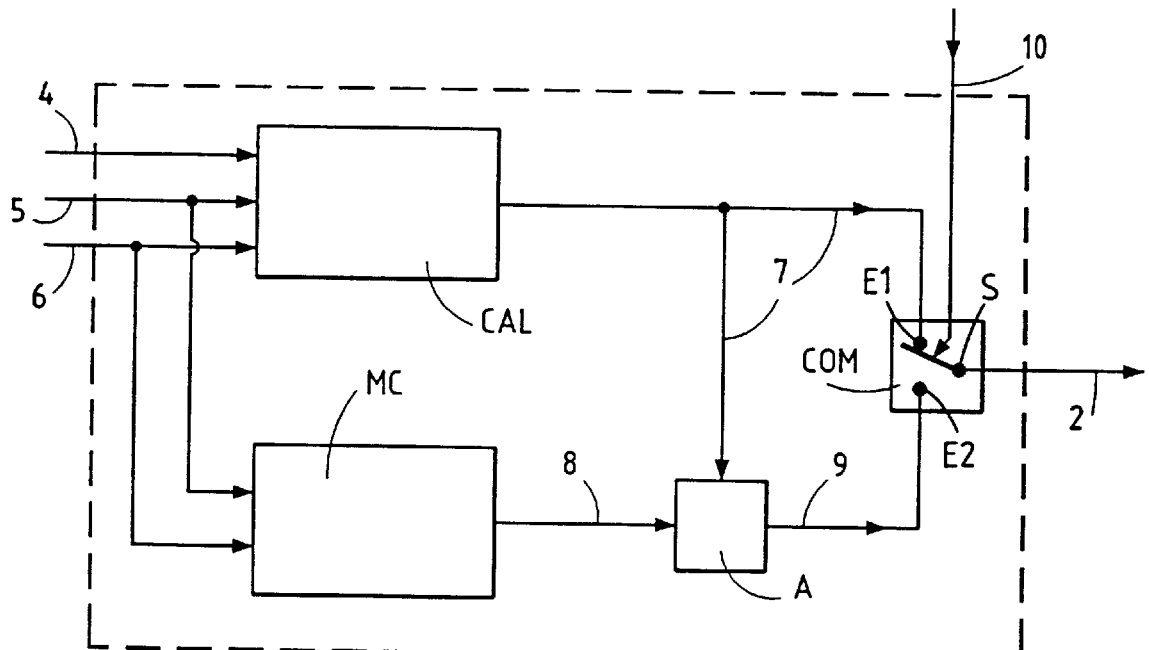
FIG. 3 is the block diagram of a calculation unit of a device in accordance with the invention.

To reduce the minimum specified speed of the aircraft A, the device 1 of the aforementioned type additionally comprises, according to the invention:

control means CONT1 and CONT4 which respectively monitor the operation of the two outer engines M1 and M4 furthest from and one on each side of the longitudinal axis X—X of the aircraft A and which detect failures of said outer engines M1 and M4, as depicted in FIG. 2; and calculation means MC and switching means COM incorporated into the corresponding calculation units UC1 and UC4, as depicted in FIG. 3 for the calculation unit UC1.

Said calculation means MC formulate second commands for controlling the speed of the associated outer engine, making it possible to obtain a reduction in thrust of this engine relative to the first commands formulated by the calculator CAL. These calculation means MC are activated only when the aircraft A is inside a predefined flight envelope:

for which its speed (received via the connection 5) is below a predetermined value; and for which its altitude (received via the connection 6) is also below a predetermined value.

As can be seen in FIG. 3, each of the calculation units UC1 and UC4 additionally comprises a comparator A which when appropriate compares the first command received from the calculator CAL via a double connection 7, with the second command received from the calculation means MC via a connection 8, and which transmits the lower value via a connection 9 to one input E2 of the switching means COM.

The other input E1 of said switching means COM is connected to the double connection 7 and therefore receives said first commands.

These switching means COM which are controlled, as detailed below, by means of a connection 10, transmit one of said first and second commands (connection 2 to the output S) to the associated outer engine, depending on the state of the switch.

Said switching means COM are controlled by the control means CONT1 or CONT4 which monitor the outer engines M1 and M4, as indicated by the connections 11. According to the invention, failure of one of said outer engines is detected when the value of a parameter characteristic of the operation of the engine lies outside an envelope of permissible predetermined values, for example when the speed of the low-pressure module of the engine is below a predetermined speed.

The detection of such a failure is transmitted from the corresponding control means, for example the control means CONT1 for failure of the engine M1, to the other control means CONT4, as said control means CONT1 and CONT4 are connected to each other for this purpose by the connections 12 and 13.

Thus, the control means CONT1 and CONT4 can exchange discrete information regarding the availability of the monitored associated engine. For this, by way of example, an open circuit may correspond to "no thrust" information and a closed circuit to "thrust available" information. In addition, for reasons of safety, the links 12 and 13 are preferably duplicated, especially in order to be able to lessen the impact of a possible breakage of one of said connections.

More specifically, according to the invention, the switching means COM are controlled by the corresponding control means CONT1 or CONT4 in such a way that:

when said outer engines M1 and M4 are operating normally, they send the first corresponding commands to these engines (input E1 activated); and when one of said outer engines, for example M1, fails, they send the commands transmitted by the comparator A of the calculation unit UC1 to the opposite outer engine M4 to said failed engine M1 (input E2 activated).

Thus, by virtue of the invention, when an outer engine fails, the thrust generated by the other outer engine is reduced in that part of the flight envelope where such action is needed, and this makes it possible to reduce the minimum specified speed and leads to the aforementioned significant advantages.

The device 1 in accordance with the invention thus makes it possible to deliver the thrust needed for overshoot with one failed engine, while at the same time satisfying the following two criteria:

satisfactory lateral control of the aircraft A; and maintaining the flight path in accordance with the specified stipulated slopes.

Of course, within the context of the present invention, the following may also be envisaged:

an embodiment in which the thrust of any engine on the opposite side to a failed engine, rather than just the thrust of the outer engine on the opposite side to the failed other outer engine as was the case in the example previously described, is reduced;

an embodiment in which the thrust of the outer engine on the opposite side to any failed engine is reduced; and a generalized embodiment, in which the thrust of all the engines on the opposite side to the failed engine, whether or not this is an outer engine, is reduced.

We claim:

1. A device for controlling the thrust of an aircraft (A), this thrust being generated by a number of engines (M1 to M4) set out more or less in a line (L—L) which is orthogonal to the longitudinal axis (X—X) of the aircraft (A), and are arranged respectively so that they are symmetric with respect to said longitudinal axis (X—X), which device comprises:

calculation units (UC1, UC4) which are associated respectively with each of said engines, each of said calculation units (UC1, UC4) formulating first commands for controlling the speed of the associated engine and sending said first commands to said associated engine;

control means (CONT1, CONT4) which respectively monitor the operation of at least some of said engines (M1, M4) and which detect failures of said monitored engines (M1, M4);

calculation means (MC) which are associated respectively at least with the calculation units (UC1, UC4) associated with said monitored engines (M1, M4) and which determine second commands for controlling the speed of said monitored engines (M1, M4) making it possible to reduce the thrust of these engines relative to said first commands; and switching means (COM) associated with said calculation means (MC) and with the corresponding calculation units (UC1, UC4) and which:

when said monitored engines (M1, M4) are operating normally send the corresponding first commands to these engines; and which when one of said monitored engines (M1) fails, send the corresponding second commands to at least one engine (M4) which is on the opposite side of the longitudinal axis (X—X) of the aircraft (A) to said failed engine (M1), wherein said control means (CONT1, CONT4), said calculation means (MC) and said switching means (COM) are associated with each of the engines (M1 to M4) of the aircraft (A) and are intended, when one of the two outer engines (M1) fails, these engines being the ones furthest away from and one on either side of the longitudinal axis (X—X), to reduce the thrust of all the engines on the opposite side of the longitudinal axis (X—X) of the aircraft (A) to said failed engine.

2. The device as claimed in claim 1, wherein said calculation means (MC) formulate said second commands only when the aircraft (A) is in a defined flight envelope.

3. The device as claimed in claim 2, wherein said flight envelope is defined by the following two combined conditions: the speed and the altitude of the aircraft are below predefined values.

4. The device as claimed in claim 1, wherein said calculation means (CAL) and said switching means (COM) are incorporated each time into the associated calculation unit (UC1).

5. The device as claimed in claim 1, wherein said control means (CONT1, CONT4) detect failure of a monitored engine when the value of a parameter characteristic of the operation of said engine lies outside an envelope of permissible predetermined values.

6. The device as claimed in claim 5, wherein said parameter characteristic of the operation of the engine represents the speed of a low-pressure module of said engine.

7. The device as claimed in claim 1, wherein said second commands for controlling the engine speed are formulated as a function of the altitude, the temperature and the speed of the aircraft.

8. The device as claimed in claim 1, wherein said second commands for controlling the engine speed are formulated in such a way as to obtain a thrust for which the aircraft can be steadied, should one of said engines fail, at a predetermined speed.

9. The device as claimed in claim 1, wherein the control means (CONT1, CONT4) associated with a pair of opposed engines are connected to each other.

10. The device as claimed in claim 1, wherein all said control means are incorporated into a central control unit.

11. A device for controlling the thrust of an aircraft (A), this thrust being generated by a number of engines (M1 to M4) set out more or less in a line (L—L) which is orthogonal to the longitudinal axis (X—X) of the aircraft (A), and are arranged respectively so that they are symmetric with respect to said longitudinal axis (X—X), which device comprises:

calculation units (UC1, UC4) which are associated respectively with each of said engines, each of said calculation units (UC1, UC4) formulating first commands for controlling the speed of the associated engine and sending said first commands to said associated engine;

control means (CONT1, CONT4) which respectively monitor the operation of at least some of said engines (M1, M4) and which detect failures of said monitored engines (M1, M4);

calculation means (MC) which are associated respectively at least with the calculation units (UC1, UC4) associated with said monitored engines (M1, M4) and which determine second commands for controlling the speed of said monitored engines (M1, M4) making it possible to reduce the thrust of these engines relative to said first commands; and switching means (COM) associated with said calculation means (MC) and with the corresponding calculation units (UC1, UC4) and which:

when said monitored engines (M1, M4) are operating normally send the corresponding first commands to these engines; and which when one of said monitored engines (M1) fails, send the corresponding second commands to at least one engine (M4) which is on the opposite side of the longitudinal axis (X—X) of the aircraft (A) to said failed engine (M1), wherein said control means, said calculation means and said switching means are associated with each of the engines (M1 to M4) of the aircraft (A) and are intended, when any one engine of the aircraft (A) fails, to reduce the thrust of all the engines on the opposite side of the longitudinal axis (X—X) of the aircraft (A) to said failed engine.

12. The device as claimed in claim 11, wherein said calculation means (MC) formulate said second commands only when the aircraft (A) is in a defined flight envelope.

13. The device as claimed in claim 12, wherein said flight envelope is defined by the following two combined conditions; the speed and the altitude of the aircraft are below predefined values.

14. The device as claimed in claim 11, wherein said calculation means (CAL) and said switching means (COM) are incorporated each time into the associated calculation unit (UC1).

15. The device as claimed in claim 11, wherein said control means (CONT1, CONT4) detect failure of a monitored engine when the value of a parameter characteristic of the operation of said engine lies outside an envelope of permissible predetermined values.

16. The device as claimed in claim 15, wherein said parameter characteristic of the operation of the engine represents the speed of a low-pressure module of said engine.

17. The device as claimed in claim 11, wherein said second commands for controlling the engine speed are formulated as a function of the altitude, the temperature and the speed of the aircraft.

18. The device as claimed in claim 11, wherein said second commands for controlling the engine speed are formulated in such a way as to obtain a thrust for which the aircraft can be steadied, should one of said engines fail, at a predetermined speed.

19. The device as claimed in claim 11, wherein the control means (CONT1, CONT4) associated with a pair of opposed engines are connected to each other.

20. The device as claimed in claim 11, wherein all said control means are incorporated into a central control unit.

* * * * *